United States Patent [19]
Milliken et al.

[11] Patent Number: 5,901,323
[45] Date of Patent: May 4, 1999

[54] PROCESS CONTROLLER WITH INTERCHANGEABLE INDIVIDUAL I/O UNITS

[75] Inventors: Jon B. Milliken; Richard J. Vanderah; Dennis G. Sickels, all of Marshalltown, Iowa

[73] Assignee: Fisher Controls International, Inc., Austin, Tex.

[21] Appl. No.: 08/176,330

[22] Filed: Jan. 3, 1994

Related U.S. Application Data

[63] Continuation of application No. 07/622,936, Dec. 11, 1990, abandoned.

[51] Int. Cl.[6] ................................................ G06F 13/00
[52] U.S. Cl. ................. 395/800.01; 395/828; 395/180
[58] Field of Search ................................... 395/800, 575, 395/500, 325, 275, 800.01, 800.32, 828, 835, 882, 280, 180; 310/71; 361/413; 364/138

[56] References Cited

U.S. PATENT DOCUMENTS

| | | | |
|---|---|---|---|
| 4,558,916 | 12/1985 | Hehl | 339/107 |
| 4,589,063 | 5/1986 | Shah et al. | 395/275 |
| 4,748,355 | 5/1988 | Anderson et al. | 310/71 |
| 4,776,706 | 10/1988 | Loiterman et al. | 374/208 |
| 4,780,631 | 10/1988 | Gröninger | 310/71 |
| 4,819,149 | 4/1989 | Sanik et al. | 364/132 |
| 4,954,949 | 9/1990 | Rubin | 395/200 |
| 4,972,470 | 11/1990 | Farago | 380/3 |
| 4,985,845 | 1/1991 | Gotz et al. | 364/492 |
| 5,099,449 | 3/1992 | Dombrosky et al. | 395/800 |
| 5,103,391 | 4/1992 | Barrett | 364/133 |

FOREIGN PATENT DOCUMENTS

| | | | |
|---|---|---|---|
| 0196032 | 10/1986 | European Pat. Off. . | |
| 0352683 | 1/1990 | European Pat. Off. . | |
| 60-5945 | 1/1985 | Japan | E04B 5/32 |
| 60-93567 | 5/1985 | Japan | G06F 13/10 |
| 61-6422 | 1/1986 | Japan | F16C 17/02 |
| 89/06389 | 1/1989 | WIPO . | |

OTHER PUBLICATIONS

Bruce A. Artwick, "Microcomputer Interfacing", Chapter 8, pp.299–313, (1980).

English Translation of Office Action dated Nov. 22, 1993 from Russian Patent Office in connection with Russian counterpart application, pp. 1–3.

Fisher Controls instruction manual entitled "Type ROC200 Remote Operational Controller (ROC)," dated Jul., 1989, pp. 1.1 through 3.10.

EPO Communication Pursuant to Article 115(2) EPC dated Oct. 18, 1993.

Observation of Third Parties Against the Patentability of EP 490 864 (3 pages), with translation (2 pages).

Reference 1: The Electronic Science, pp. 14–19, with translation pp. 1–11 and 14.

Reference 2: Electronics, pp. "No. 046," 120, 42–43, 46–51, with translation pp. 15–36 and 38.

Reference 3: Electronics, pp. 66–69 and 116, with translation pp. 40–44 and 46.

(List continued on next page.)

*Primary Examiner*—Alpesh M. Shah
*Attorney, Agent, or Firm*—Marshall, O'Toole, Gerstein, Murray & Borun

[57] ABSTRACT

A controller of the type used in process control includes a plurality of modular I/O units. The I/O units includes I/O circuits which may be of four basic types: digital input circuits, digital output circuit, analog input circuits and analog output circuits. Each of the I/O circuits has a code generator that generates a binary code indicating the type of I/O circuit. The controller is microprocessor-controlled and periodically communicates with the I/O circuits and determines the type of each I/O unit based upon the binary code. The I/O units may be temperature-compensated based upon the temperature within the housing of the controller, and other integrity checks may be performed on the I/O units. The controller also has a change module routine which allows the I/O units to be installed or removed during operation of the controller.

1 Claim, 9 Drawing Sheets

OTHER PUBLICATIONS

Reference 4: Flegel, *Elektrotechnik fur den Maschinenbauer*, pp. 419–421 and 426–429.

Letter to Paul Seuferer dated Jan. 21, 1991.

Michael Babb, "Single–Point I/O May Have an "Opto–mistic" Future," dated Mar. 1990, reprinted from *Control Engineering*, pp. 1–3.

Opto 22 brochure entitled "Data Acquisition and Control With a Mind of Its Own," pp. 1–6, received by Fisher Controls on Jan. 28, 1991.

"HP 48000 RTU Measurement and Control Unit", a 28–page brochure.

"Integrating the 48000 Into Your System", Hewlett Packard manual, pp. 3–1 through 3–22 and pp. 6–21 through 6–23a.

"Intelligent Multiplexers Improve Host Capacity and Safety," Oct., 1990, *Control Engineering*.

"Serial Multiplexer Plus Radio Modems Enable Pumping Stations to Run Reliably, Reduce Costs," Sep./Oct., 1990, *Waterworld News*.

"Monitoring Emissions With a PC," Sep., 1990, *Control*.

"I/Oplexer—The Smart Solution—Quick Reference Card v 3.1," a duTec technical document.

A duTec 2–sided price list.

A 2–sided brochure regarding duTec's I/Oplexer.

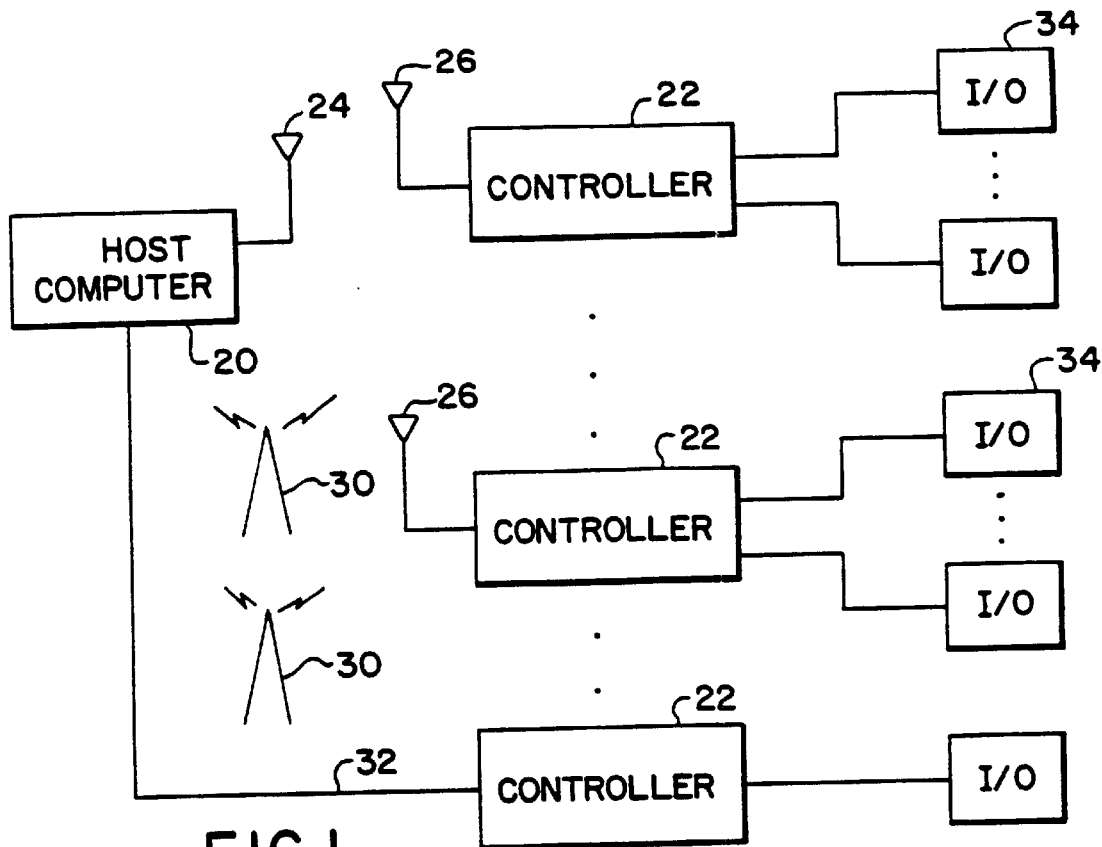
FIG.1
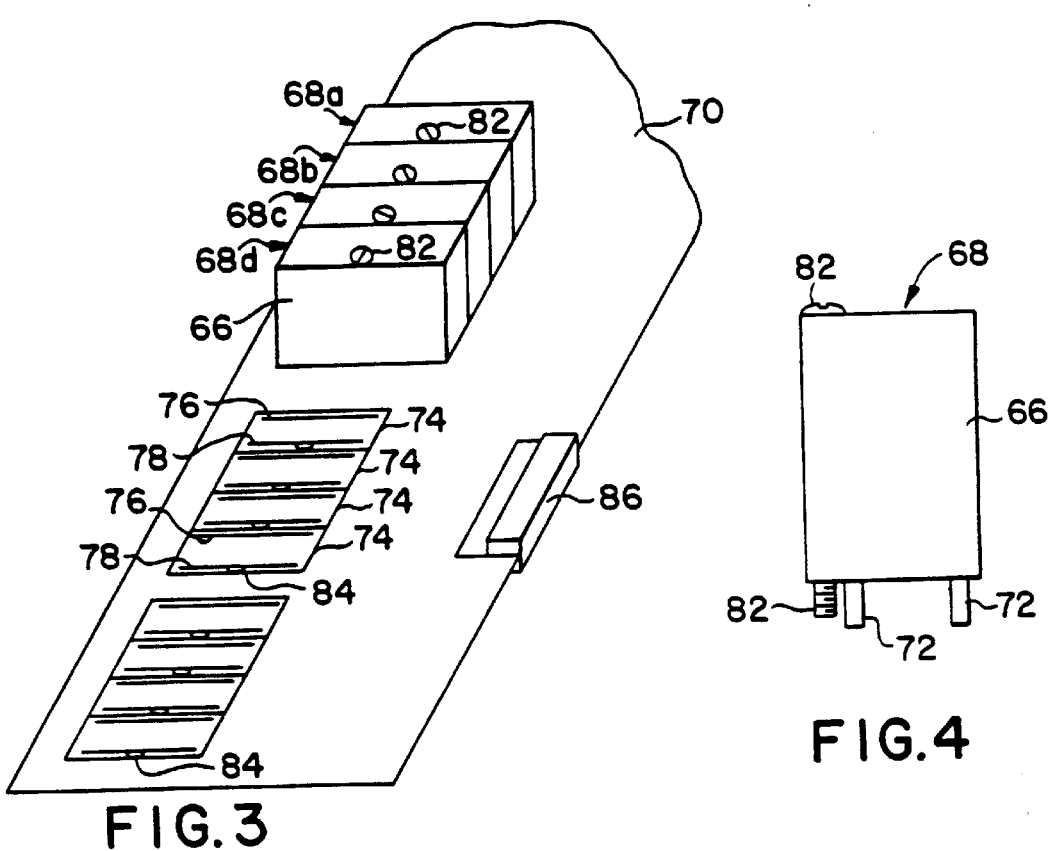
FIG.3
FIG.4

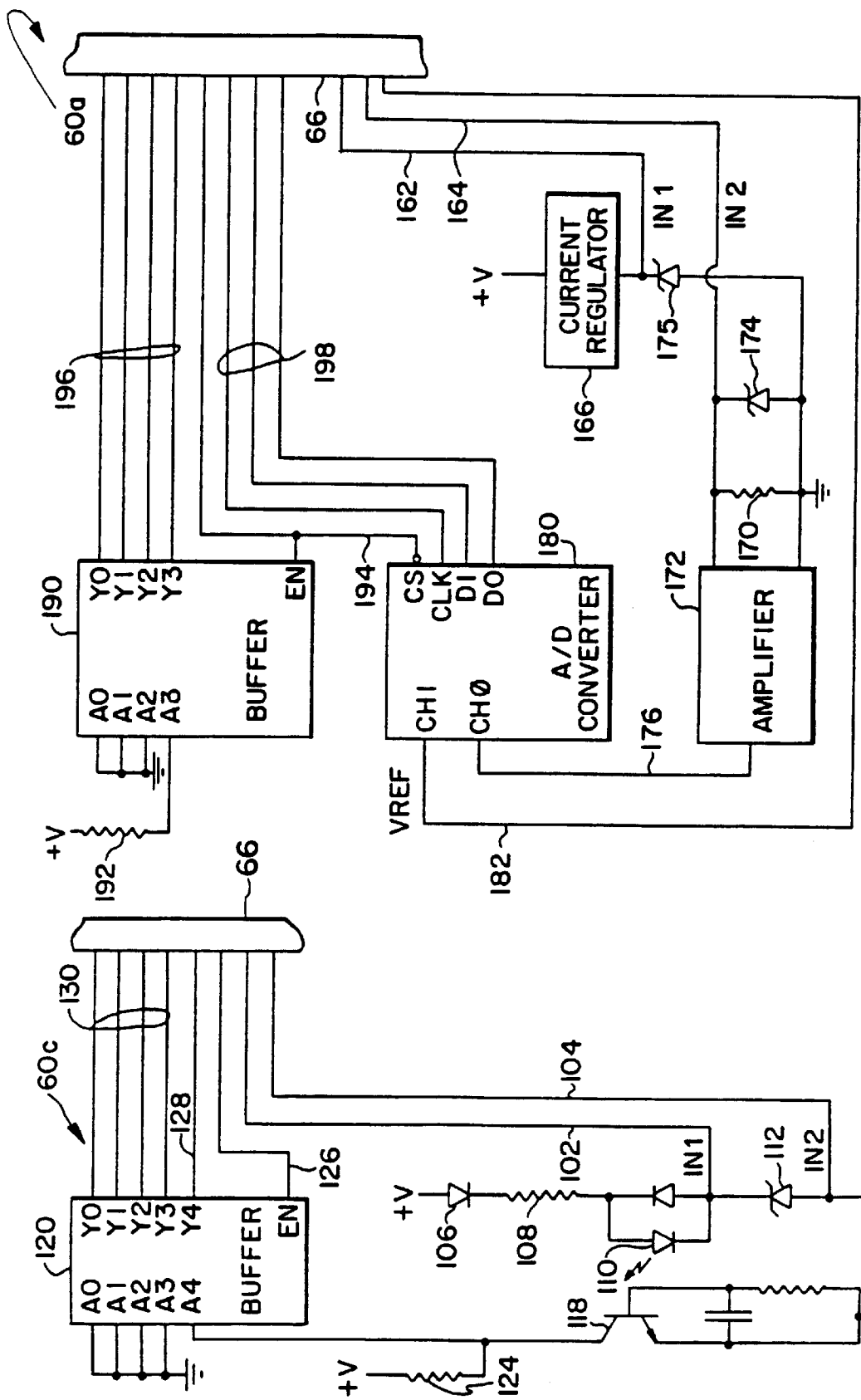

PROCESS CONTROLLER WITH INTERCHANGEABLE INDIVIDUAL I/O UNITS

This is a continuation of U.S. application Ser. No. 07/622,936, filed Dec. 11, 1990, now abandoned,

BACKGROUND OF THE INVENTION

The present invention relates to a process controller having a plurality of modular input/output (I/O) units.

Process controllers are used to perform a variety of functions including process control functions and data-gathering functions. Process control functions include the monitoring of various conditions, such as liquid and gas pressures, flows, temperatures, etc., and responding to the state of the conditions by selectively activating pumps, valves, etc. to control the monitored conditions. The process control functions relate to such applications as oil and natural gas production and distribution, industrial plant control, etc. The data-gathering functions of process controllers allow a historical record of such variables as pressures or flows to be made over an extended period of time, such as several weeks or months, for example.

Typically, a number of process controllers are used in a computer system or network having a central host computer. For example, a single host computer may communicate with as few as 10 to more than 100 process controllers.

A conventional process controller typically contains a plurality of printed circuit (PC) boards within a housing, each of the PC boards having electronic components and circuitry to accomplish various functions. One such PC board is a controller board that controls the overall operation of the controller. The controller board typically has a microprocessor, a computer program storage memory, such as read-only memory (ROM), and a random-access memory (RAM), which are interconnected by one or more buses.

The process controller also has various types of I/O circuits, which may be provided on the controller board or on one or more dedicated I/O boards. I/O boards typically have a fixed number of various types of conventional I/O circuits. There are at least four basic types of I/O circuits: a digital input circuit, a digital output circuit, an analog input circuit, and an analog output circuit. The digital I/O circuits are used to monitor and control conditions and/or devices having only two states, on and off for example. The analog I/O circuits are used where the condition or device has many states. For example, an analog input circuit may be used to input the temperature of a liquid in a tank to the process controller, and an analog output circuit may be used to control the position of a valve having many positions.

The use of the four types of I/O circuits as described above is conventional. However, the manner in which the I/O circuits are implemented within conventional controllers has disadvantages. In particular, a specific number of I/O circuits are typically implemented on each I/O board within the controller. For example, each I/O board might have four digital input circuits, four digital output circuits, four analog input circuits, and four analog output circuits. Because the number and type of I/O circuits on each I/O board are fixed, there is no flexibility in configuring the I/O boards.

For example, suppose for a particular application a customer needed five digital input circuits and three digital output circuits. In this case, the customer would have to purchase two of the I/O boards described above in order to obtain the five digital input circuits. Moreover, the customer would not need the analog I/O circuits, but would have to purchase them anyway.

The inflexible allocation of the I/O circuits on the I/O boards also causes the control capability of the process controller to be unduly limited. A process controller typically has a maximum number of internal slots into which I/O boards can be inserted. If the controller had three I/O slots for the specific I/O board described above, that controller could only control a maximum of 12 digital input circuits, 12 digital output circuits, 12 analog input circuits, and 12 analog output circuits. If the application required 13 circuits of any particular type, an additional process controller would be required. For example, if the application required 13 digital input circuits and no other type of I/O circuits, two controllers would be required. In addition to having to purchase a second controller, the customer would have to pay for 16 of each of the four types of I/O circuits, for a total of 64 separate I/O circuits, even though only 13 I/O circuits were needed.

Even if the disadvantages described above were somehow overcome, by not including circuit components for the unwanted I/O circuits on the I/O boards for example, the conventional manner of implementing I/O circuits would suffer other disadvantages due to its inherent inflexibility.

SUMMARY OF THE INVENTION

The present invention is directed to a process controller having a plurality of modular I/O units. The I/O units may include I/O circuits of four different types: an analog input circuit, an analog output circuit, a digital input circuit, and a digital output circuit. Each of the I/O units is releasably connected to one of a plurality of connectors, or sockets, within the controller. Each of the sockets is identical, so that any I/O unit may be inserted into any socket, regardless of the type of I/O unit. As a result, the number and types of I/O units provided with the controller is extremely flexible.

The controller automatically determines the type of each I/O unit within the controller by transmitting a code-request signal to each I/O unit. Upon receipt of the code-request signal from the controller, the I/O unit transmits back to the controller a multi-bit binary code indicating the type of I/O unit that it is. Based upon the code received from the I/O unit, the controller utilizes a particular communication protocol to communicate with that I/O unit. For example, if four different types of I/O units were provided within the controller, four different communication protocols would be necessary, one for each type of I/O unit.

The operator may change the position of one or more I/O units during operation of the controller. This procedure is accomplished by the entry into the controller of a module-change request by the operator. Upon receiving the module-change request, the controller suspends communication with the I/O units and generates a visual indication, or prompt, indicating that communication has been suspended. Upon seeing the prompt, the operator may then change the position of any number of I/O modules, by inserting additional modules into the controller, removing modules from the controller, or changing the positions of modules within the controller. After the changes have been completed, the operator inputs a change-complete command into the controller which indicates that all changes have been made. Upon receiving the change-complete command, the controller communicates with each of the I/O units to determine its type before resuming normal operation.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 illustrates a communication system having a host computer and a plurality of process controllers;

FIG. 3 is an I/O board for a process controller having four modular I/O units connected thereto;

FIG. 4 is a side view of a modular I/O unit;

FIG. 5 is a circuit diagram of a digital input circuit shown schematically in FIG. 2;

FIG. 6 is a circuit diagram of an analog input circuit shown schematically in FIG. 2;

DETAILED DESCRIPTION OF THE PREFERRED EMBODIMENTS

Figure 2:
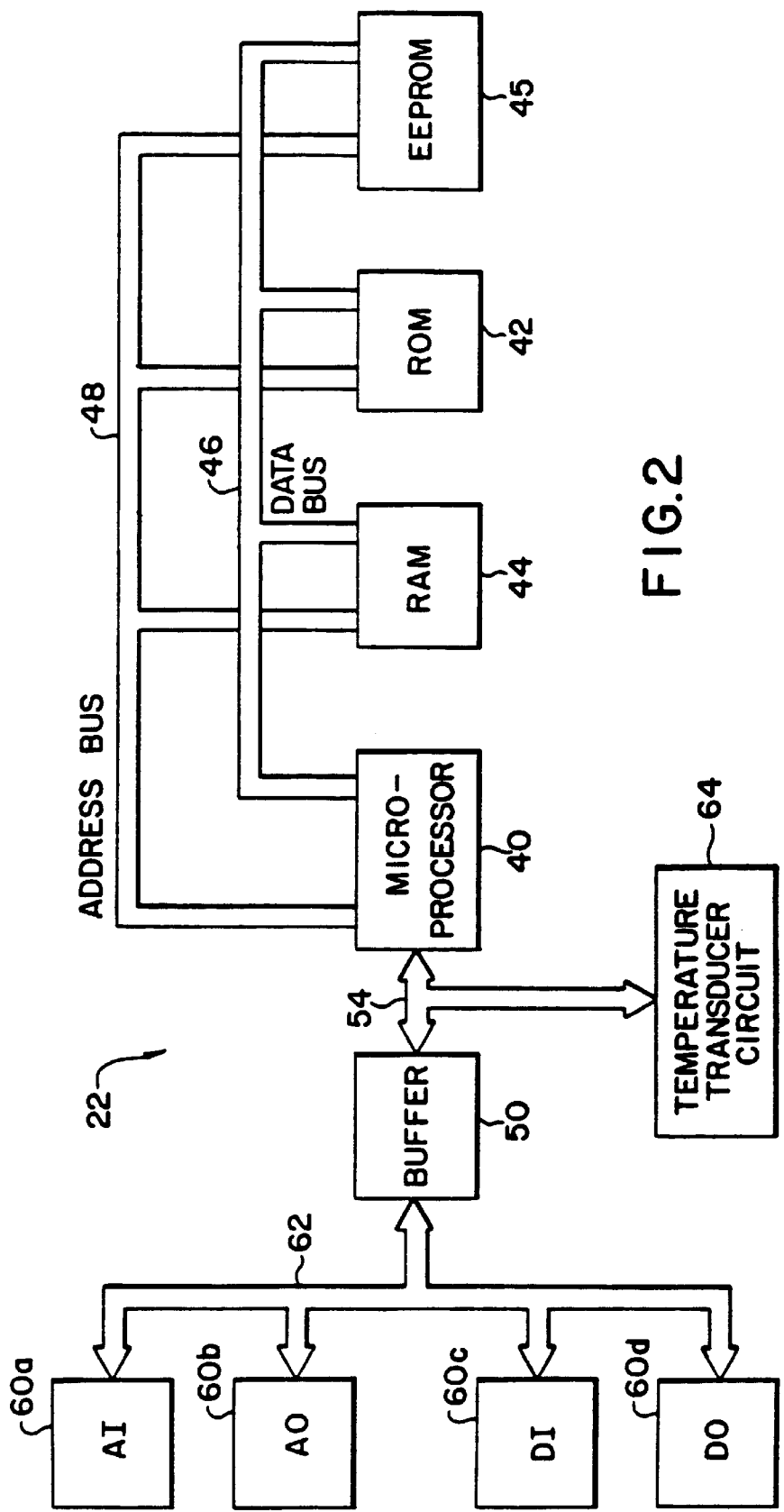
FIG. 2 is a block diagram of a process controller shown schematically in FIG. 1.

A communication system is illustrated in FIG. 1. The communication system includes a host computer 20 and a plurality of process controllers 22 at a number of locations remote from the computer 20. The host computer 20 periodically communicates with each of the controllers 22 via radio communication. To this end, the host computer 20 has an antenna 24 and the controllers 22 have antennas 26. In order to enhance radio communication, the communication system may include a plurality of radio repeaters 30. Instead of utilizing radio communication, the communication system may use other types of communication links, such as a telephone line 32 interconnecting the host computer 20 with the controllers 22.

The controllers 22 are connected to a plurality of I/O devices 34. The I/O devices 34 may be any type of devices that are either driven by analog or digital signals or that sense conditions and generate analog or digital signals in response to the conditions sensed. Examples of I/O devices include pumps which may be turned on or off, valves the positions of which are incrementally variable, temperature and pressure transducers, etc.

In operation, each of the controllers 22 communicates with the I/O devices 34 to which it is connected to control the process for which that controller is used. As a simple example, one of the controllers 22 may be connected to two I/O devices 34, one being a fluid level transducer (not shown) for sensing the level of fluid within a tank and the other being a valve (not shown) within a pipeline connected to the tank. The fluid level transducer would generate and transmit to the controller 22 an analog input signal, and the controller 22 would control the level of fluid within the tank by sending an analog output signal to the valve to control the position of the valve. Such control could be any type of conventional control, such as proportional (P) control, proportional-plus-integral (PI) control, or proportional/integral/derivative (PID) control.

In addition to performing control functions, the controllers 22 perform data-gathering functions by storing various data in memory. Such data might include the magnitude of the tank fluid levels over a predetermined period of time.

The controllers 22 periodically communicate with the host computer 20. This periodic communication may relate to the control of the I/O devices 34, or it may be for the purpose of gathering data from the controllers 22 for storage in the host computer 20.

A block diagram of the electronics of one of the process controllers 22 is illustrated in FIG. 2. The overall operation of the controller 22 is controlled by a microprocessor 40 which executes a computer program stored in a read-only memory (ROM) 42. The microprocessor 40 and the ROM 42 are connected to a random-access memory (RAM) 44 and an EEPROM 45 by means of a data bus 46 and an address bus 48. The RAM 44 functions as general purpose memory and also may be used to store historical data generated by the I/O devices 34. Alternatively, historical data may be stored in a removable memory module like the one described in a patent application entitled, "Process Controller With Removable Memory Module," U.S. Ser. No. 07/622,938 filed Dec. 11, 1990, the disclosure of which is incorporated herein by reference. The RAM 44, which is a volatile memory, may be backed up by one or more batteries so that data is not lost in the event of a power failure. The EEPROM 45, which is a nonvolatile memory, may be used to store system initialization and/or configuration data.

The microprocessor 40 is connected to a bidirectional buffer 50 via a bidirectional bus 54. The buffer 50 is connected to a plurality of I/O circuits 60 via a bidirectional bus 62. Although only four I/O circuits 60 are shown in FIG. 2, there would be at least one I/O circuit 60 for each of the I/O devices 34 to which the controller 22 was connected. FIG. 2 illustrates the four basic types of I/O circuits, which include an analog input (AI) circuit 60a, an analog output (AO) circuit 60b, a digital input (DI) circuit 60c, and a digital output (DO) circuit 60d. A temperature transducer circuit 64 is connected to the bus 54. As described in more detail below, the microprocessor 40 compensates the analog value generated by the analog input circuit 60a based upon the analog temperature value supplied by the transducer circuit 64.

The manner in which the I/O circuits 60 are structurally implemented in the controller 22 is illustrated in FIG. 3. Each of the I/O circuits 60 is provided within a separate housing 66, which may be plastic housings for example. The combination of the I/O circuit 60 within the housing 66 is referred to herein as an I/O module 68. The I/O modules 68 are releasably mounted on a printed circuit board 70, which is referred to herein as an I/O board. Each of the I/O modules 68 has two rows of connector pins 72 as shown in FIG. 4.

Each module 68 may be inserted into a respective connector or socket 74 in the I/O board 70. Each socket 74 has two rows of holes or apertures represented by the lines 76, 78 provided to match the pattern of connector pins protruding from each of the I/O modules 68. Each module 68 is secured to the I/O board 70 by a screw 82 in the module 68 and a respective threaded bore 84 in the I/O board 70. The I/O board 70 also has a connector 86 for electrically connecting each of the I/O modules 68 to the bus 62 (FIG. 2), or to the I/O devices 34, as the case may be. The specific manner of connecting the I/O modules 68 to the I/O board 70 is not considered important, and different manners of connection could be used.

While only four I/O modules 68 are illustrated on the I/O board 70 in FIG. 3, more modules 68 could be provided in the empty sockets 74, which are provided in groups of four. The I/O board 70 thus may have a capacity of at least 16 I/O modules.

It should be appreciated that each of the sockets 74 is identical, and that the connector pins 72 protrude from the different I/O modules 68 in identical fashion, regardless of the type of I/O module. Thus, any of the four types of I/O modules 68 can be inserted into any of the sockets 74 in the I/O board 70. As a result, the I/O board 70 can carry any combination of I/O modules 68. For example, if the I/O board 70 had 16 sockets on it, the I/O board 70 could carry 16 analog input modules, or 9 analog input modules and 7 analog output modules, or 13 digital input modules and 3 digital output modules, etc.

While FIG. 2 illustrates only four I/O circuits 60, it should be appreciated that more I/O circuits 60 would typically be used, and that all such I/O circuits would be connected to the microprocessor 40 via the buffer 50. The buffer 50 could be implemented with a plurality of bidirectional buffers, or a plurality of unidirectional buffers. It should also be understood that the controller 22 could contain multiple I/O boards 70 so as to provide more I/O modules 68. Alternatively, the I/O modules could be mounted on the same printed circuit board as the microprocessor 40.

The microprocessor 40 periodically reads from or writes to each of the I/O modules 68 at a predetermined rate, such as 20 times per second for example. The manner in which this is performed is described below in connection with FIGS. 5–8, which are circuit diagrams of the four I/O circuits 60a–60d, and FIG. 10, which is a flowchart of a portion of a computer program stored in the ROM 42 that controls the communication with the I/O modules 60.

Digital Input Circuit

Now referring to FIG. 5, a circuit diagram of the digital input circuit 60c is shown. The digital input (DI) circuit includes a pair of conductors or lines 102, 104 which are electrically connected to one of the I/O devices 34. Although the lines 102, 104 are shown terminating at the bottom portion of the I/O module housing 66, suitable connectors and cabling (not shown) connect the lines 102, 104 to the I/O device 34. The I/O device 34 generates either an open circuit or a short circuit across the lines 102, 104, depending upon the state of the condition being monitored. If the I/O device 34 generates a short circuit across the lines 102, 104, a current path is created from a supply voltage V through a diode 106, a resistor 108, a light-emitting diode 110, and through the lines 102, 104 to ground. A zener diode 112 is provided between the lines 102, 104 for surge protection.

Due to the current flow, the light-emitting diode 110 turns on a transistor 118 which pulls down the voltage at the input A4 of a buffer circuit 120. In the absence of current through the transistor 118, the voltage at the buffer input A4 is normally high due to its connection to a supply voltage V through a resistor 124.

If the I/O device 34 does not generate a short circuit across the lines 102, 104, the light-emitting diode 110 is not illuminated, and the transistor 118 does not turn on so that the voltage at the buffer input A4 remains high.

When the buffer 120 is enabled via an enable signal sent to the buffer 120 by the microprocessor 40 via a line 126, the voltage value at the buffer input A4 is transmitted to its Y4 output, and to the microprocessor 40 via a line 128.

The buffer 120 also provides a second function of indicating to the microprocessor 40 that the I/O circuit 60c is a digital input circuit. This is accomplished by buffer inputs A0 through A3 being tied to ground. When read by the microprocessor 40, the Y0 through Y3 outputs associated with the A0 through A3 inputs supply the binary code 0000 to the microprocessor 40 via four lines 130. This particular code signifies to the microprocessor 40 that it is communicating with a digital input circuit.

Analog Input Circuit

A circuit diagram of the analog input circuit 60a is illustrated in FIG. 6. The analog input circuit 60a has a pair of lines 162, 164 connected to an I/O device 34 that complete a conventional 4–20 milliampere (ma) current loop between the analog input circuit 60a and the I/O device 34. A current regulator 166 connected to a supply voltage V supplies 25 ma of current to the I/O device 34 via the line 162. A current that varies between 4–20 ma is supplied from the I/O device 34 via the line 164. This variable current is supplied across a resistor 170 to generate a variable voltage that is supplied to a scaling amplifier 172. A pair of zener diodes 174, 175 provide surge protection.

The voltage generated by the scaling amplifier 172 is supplied to channel 0 of an A/D converter 180 via a line 176. The scaling amplifier 172, which may comprise a conventional operational amplifier circuit, performs a scaling function that ensures that the range of voltages generated across the resistor 170 is about the same as the conversion range of an A/D converter 180 to provide maximum resolution. In cases where those voltage ranges are about the same, the scaling amplifier would be unnecessary.

Channel 1 of the A/D converter 180 is connected to a line 182 which supplies a constant reference voltage. As described in more detail below, the reference voltage is periodically converted by the A/D converter 180 and read by the microprocessor 40 to ensure that the A/D converter 180 is functioning properly.

The analog input circuit 60a also includes a buffer 190 having inputs A0 through A2 connected to ground and input A3 connected to a relatively high voltage via a resistor 192. When the enable input of the buffer 190 is activated by the microprocessor 40 via a line 194, the buffer 190 transmits the binary code 0001 to the microprocessor 40 via four lines 196. Based upon this binary code, the microprocessor 40 can identify the I/O circuit 60a as an analog input circuit.

A plurality of lines 198 carry clocking and data signals between the microprocessor 40 and the A/D converter 180, which may be an LTC1290DCJ integrated circuit chip commercially available from Linear Technologies. The line 198 connected to the DI input of the A/D converter 180 is used to select the parameters of the converter 180, such as which channel is to be read, for example. The line 198 connected to the DO output of the converter 180 transmits in serial fashion the multi-bit binary signal generated by the A/D converter 180 from the original analog input from the lines 162, 164.

The binary signal, corresponding to the analog input value, transmitted from the A/D converter 180 is temperature compensated by the microprocessor 40 based upon the temperature sensed by the temperature transducer 64. This is performed since the gain of the analog input circuit 60a varies with temperature.

Digital Output Circuit

Figure 7:
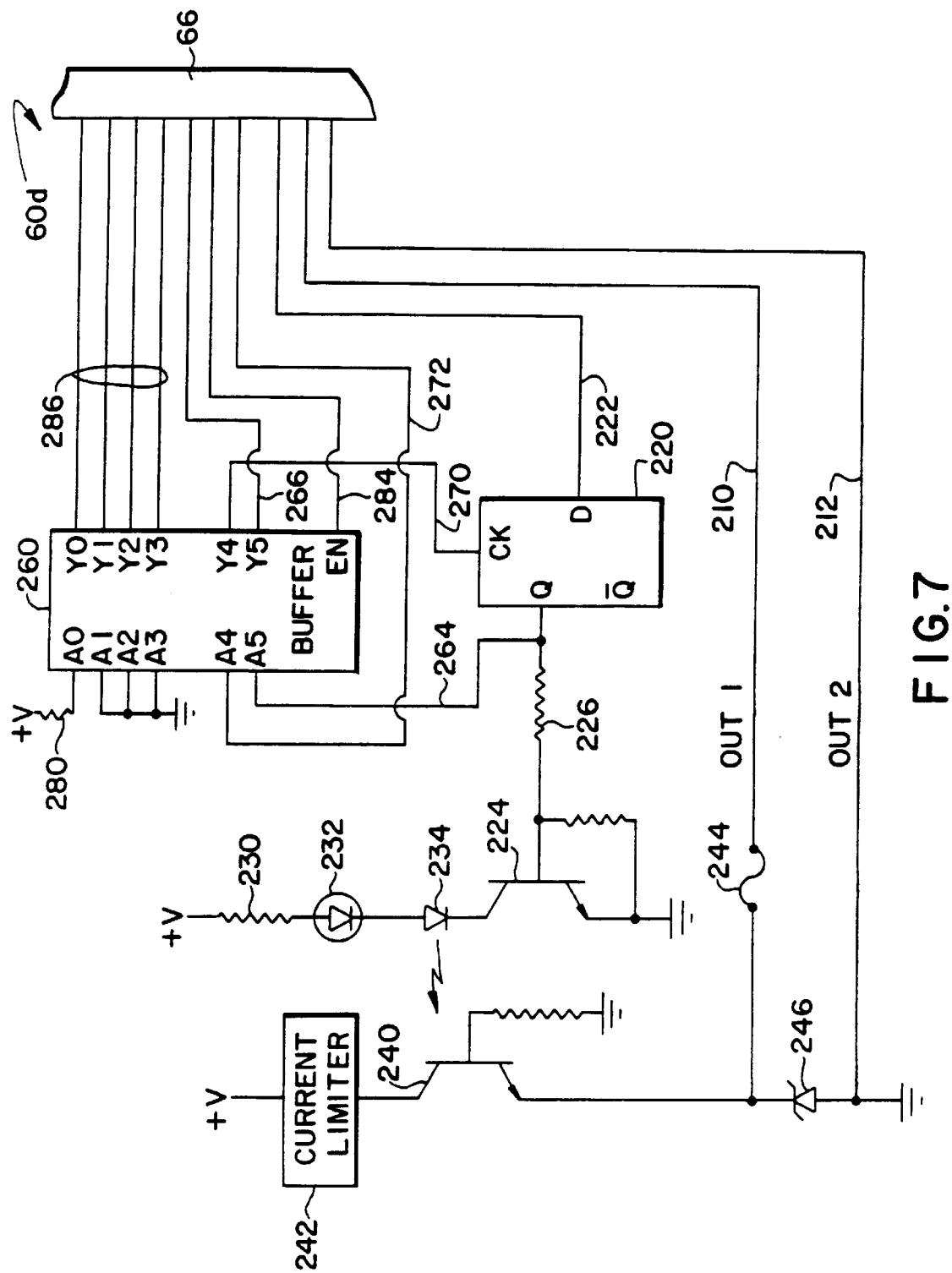
FIG. 7 is a circuit diagram of a digital output circuit shown schematically in FIG. 2.

A circuit diagram of the digital output circuit 60d is shown in FIG. 7. The digital output circuit includes a pair of lines 210, 212 connected to an I/O device 34 that is to be controlled by the digital output value. To control the value of the digital output, the microprocessor 40 transmits the appropriate binary signal to the input of a D flip-flop 220 via a line 222. The noncomplemented Q output of the flip-flop 220 is transmitted to the base of a transistor 224 via a resistor 226. When the Q output is high, the transistor 224 turns on, thus drawing current from a supply voltage V through a resistor 230 and a pair of diodes 232, 234. Upon current flow through the light-emitting diode 234, the light generated causes a transistor 240 to be turned on. As a result, current is drawn from a supply voltage V through a current limiter 242, through a fuse 244 into the output line 210, and back from the I/O device 34 via the input line 212 to ground. A zener diode 246 is provided for surge protection.

When the microprocessor 40 provides a low voltage signal to the input of the flip-flop 220, the transistors 224 and 240 do not conduct, thus preventing any current from being supplied to the line 210.

The Q output of the flip-flop 220 is also provided to the A5 input of a buffer 260 via a line 264 for the purpose of allowing the microprocessor 40 to check to make sure that the flip-flop 220 is providing the output that the microprocessor 40 specified via the line 222. To this end, upon supplying the signal on the line 222, the microprocessor 40 reads the Y5 output of the buffer 260 via a line 266 to make sure that it is the same binary value as the signal that was transmitted via the line 222.

The flip-flop 220 is clocked in a conventional manner by the Y4 output of the buffer 260 via a line 270. The Y4 output of the buffer 260 is controlled by its A4 input as supplied by the microprocessor 40 via a line 272.

The buffer 260 also has an input A0 tied to a relatively high voltage through a resistor 280 and three inputs A1 through A3 which are tied to ground. When enabled via a line 284, the buffer 260 transmits to the microprocessor 40 via the four lines 286 the binary code 1000 on its Y0 through Y3 outputs. The binary code 1000 signals the microprocessor 40 that the circuit 60d is a digital output circuit.

Analog Output Circuit

Figure 8:
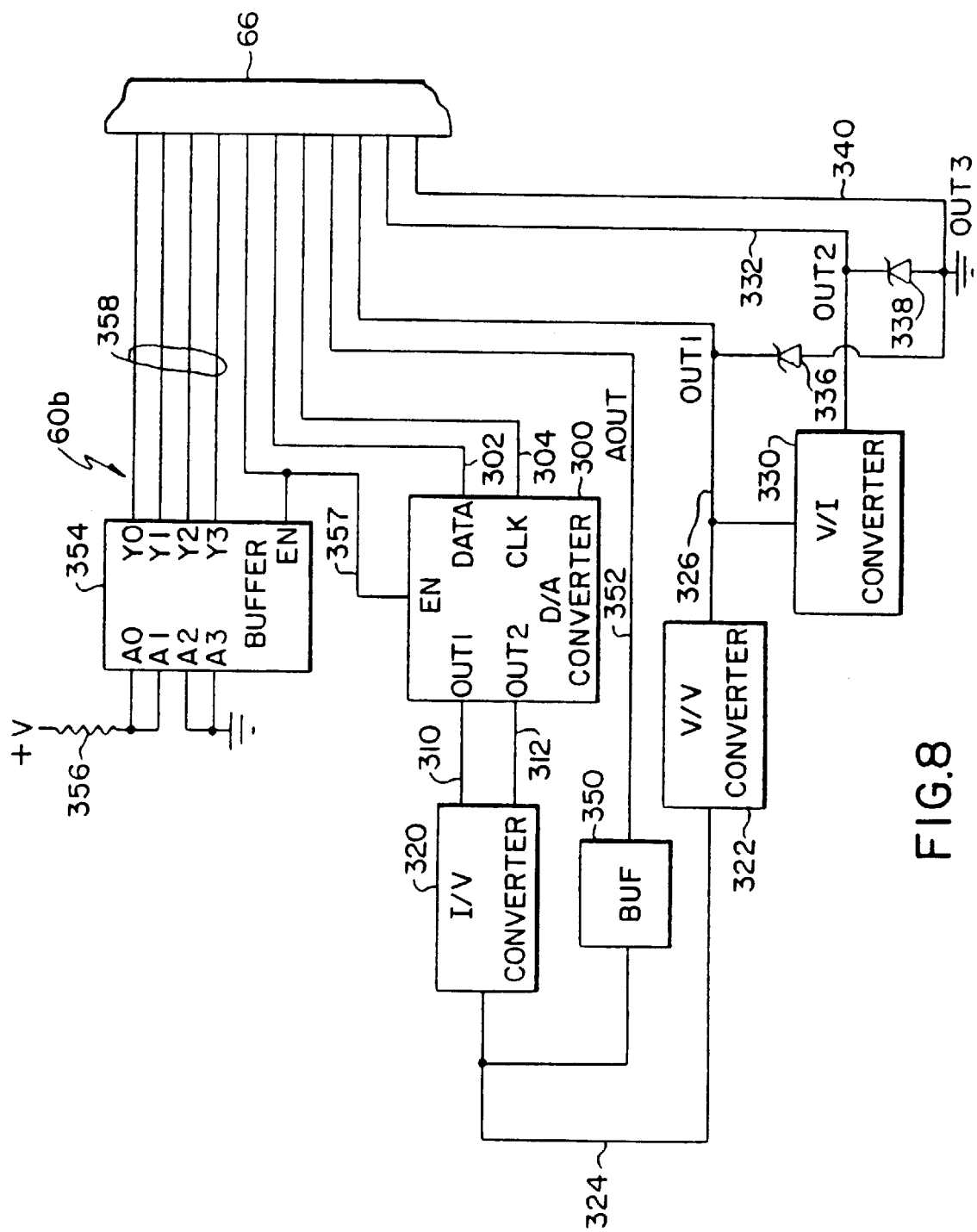
FIG. 8 is a circuit diagram of an analog output circuit shown schematically in FIG. 2.

A circuit diagram of the analog output circuit 60b is shown in FIG. 8. The analog output circuit 60b, which generates and transmits an analog signal to an I/O device 34, includes a digital-to-analog (D/A) converter 300 having a DATA input coupled to a line 302 and a CLK input coupled to a line 304. The microprocessor 40 specifies the value of the analog signal to be output to the I/O device 34 by transmitting a multi-bit binary signal in serial fashion to the DATA input via the line 302. Upon receiving this binary signal, the D/A converter 300 generates a current having a corresponding value in a pair of lines 310, 312 connected to its OUT1 and OUT2 outputs.

The current is provided to a current-to-voltage (I/V) converter 320 via the lines 310, 312. The I/V converter 320 generates a voltage proportional to the input current and transmits the voltage to a voltage-to-voltage (V/V) converter 322 via a line 324. The V/V converter 322 generates a voltage on a first output line 326. The line 326 is also connected to a voltage-to-current (V/I) converter 330, which converts the voltage at its input to a current and transmits the current to a second output line 332. A pair of zener diodes 336, 338 are connected between the two output lines 326, 332 and a third output line 340 to provide surge protection.

The three output lines 326, 332, 340 are included to provide flexibility in the types of I/O devices 34 that the analog output circuit 60b can control. In particular, I/O devices 34 that are voltage-driven are connected between the output lines 326 and 340, whereas I/O devices 34 that are current-driven are connected between the output lines 332 and 340.

The output of the I/V converter 320 on the line 324 is also provided to a buffer 350. The purpose of buffering the output of the I/V converter 320 is to allow the microprocessor 40 to check the accuracy of the voltage generated by the I/V converter 320 to make sure that it corresponds to the magnitude of the multi-bit binary signal that the microprocessor 40 transmitted to the analog output circuit via the line 302. The output of the buffer 350 is provided on a line 352 as an AOUT signal. As described below, this AOUT signal is transmitted to an A/D converter in the temperature transducer circuit 64 where its value is periodically read by the microprocessor 40.

The analog output circuit 60b also includes a buffer 354. The buffer 354 has two inputs A0, A1 tied to a relatively high voltage through a resistor 356 and two inputs A2, A3 which are tied to ground. When enabled via a line 357, the buffer 354 transmits to the microprocessor 40 the binary code 1100 on its Y0 through Y3 outputs via four lines 358. The binary code 1100 signals the microprocessor 40 that the circuit 60b is an analog output circuit.

Temperature Transducer Circuit

Figure 9:
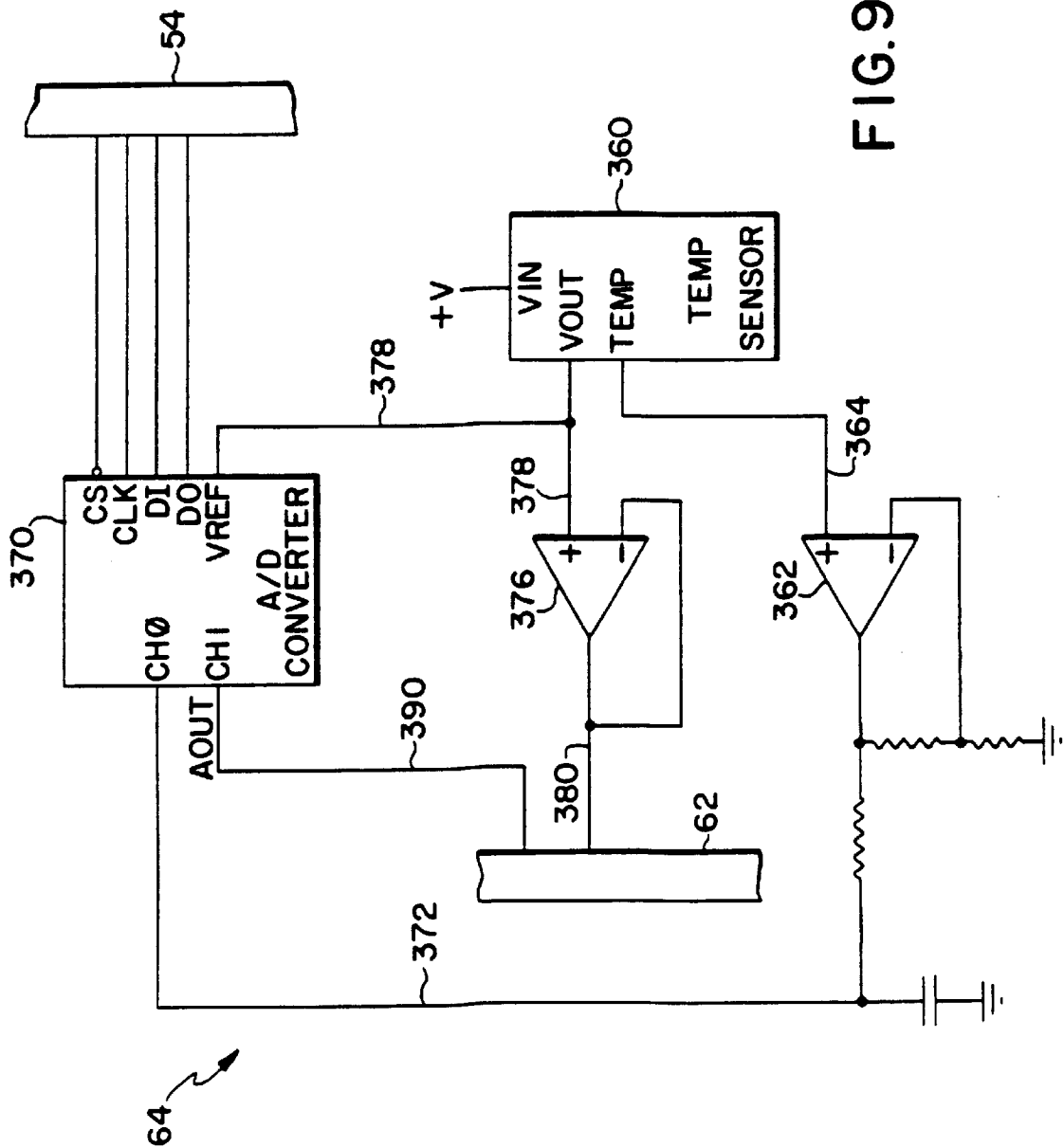
FIG. 9 is a circuit diagram of a temperature transducer circuit shown schematically in FIG. 2.

FIG. 9 is a circuit diagram of the temperature transducer 64 schematically shown in FIG. 2. The transducer circuit 64 includes a temperature sensor circuit 360 that generates an analog signal on its TEMP output that is proportional to the sensed temperature. Since the sensor circuit 360 is physically located within the housing of the controller 22, the sensed temperature is that temperature within the controller housing, which should be substantially the same temperature as the analog input circuit modules 60 since they are also located within the same controller housing. The sensor circuit 360 may be a commercially available LT1019 integrated circuit chip.

The analog temperature signal generated by the temperature sensor 360 is provided to the noninverting input of an operational amplifier 362 via a line 364. The purpose of the operational amplifier 362 is to amplify the temperature signal since it has a relatively small voltage (2.1 millivolts/°Kelvin).

The output of the operational amplifier 362 is connected to channel 0 of an A/D converter 370 via a line 372. The A/D converter 370 converts the analog signal to multi-bit binary form for serial transmission from its DO output to the microprocessor 40 via the bus 54. Channel 1 of the A/D converter 370 is connected to a line 390, which is connected to receive the AOUT signal from the line 352 (FIG. 8) via the bus 62. As described in more detail below, the A/D converter 370 periodically converts the AOUT signal on the line 390 to verify the correct operation of the analog output circuit of FIG. 8.

The temperature sensor 360 generates a temperature-compensated reference voltage on its VOUT output. Because it is temperature compensated, this reference voltage is constant regardless of changes in temperature. The compensated reference voltage is supplied to the A/D converter 370. Supplying the compensated reference voltage to the A/D converter 370 is advantageous since it reduces any temperature-induced fluctuations within the converter 370, thus allowing for more accurate conversions.

The compensated reference voltage is also supplied to the noninverting input of an operational amplifier 376 via a line 378. The amplifier 376 acts as a buffer, and its output on the line 380 is electrically connected to the line 182 shown in FIG. 6 via the bus 62 (FIG. 2) for the purpose of supplying the reference voltage for the A/D converter 180.

Operation

During operation of the controller 22, a number of tasks relating to process control are continuously performed.

These tasks and the manner in which they are performed are disclosed in a patent application entitled, "Operating System For A Process Controller," U.S. Ser. No. 07/622,937 filed Dec. 11, 1990, the disclosure of which is incorporated herein by reference. The task that relates to the communication between the microprocessor 40 and the I/O circuits 60 is described in detail below.

Upon power up, the microprocessor 40 interrogates each of the I/O modules 68 to which it is connected to determine which type of I/O module is in each of the sockets 74 on the I/O board(s) 70. This interrogation entails transmitting a code-request signal, which in this particular case is a buffer enable signal, and reading the four-bit binary code transmitted by the buffer in each I/O circuit. Based upon each particular code, the microprocessor 40 determines the type of each of the I/O modules 68 and "remembers" what type each I/O device is by storing each code or a similar type code in memory. Thus, the microprocessor 40 need only interrogate the I/O modules 68 once upon power up.

After the initial interrogation, the microprocessor 40 periodically executes an I/O routine 400 to read from or write to each of the I/O modules 68. The I/O routine 400 could be performed 20 times per second, for example.

Figure 10:
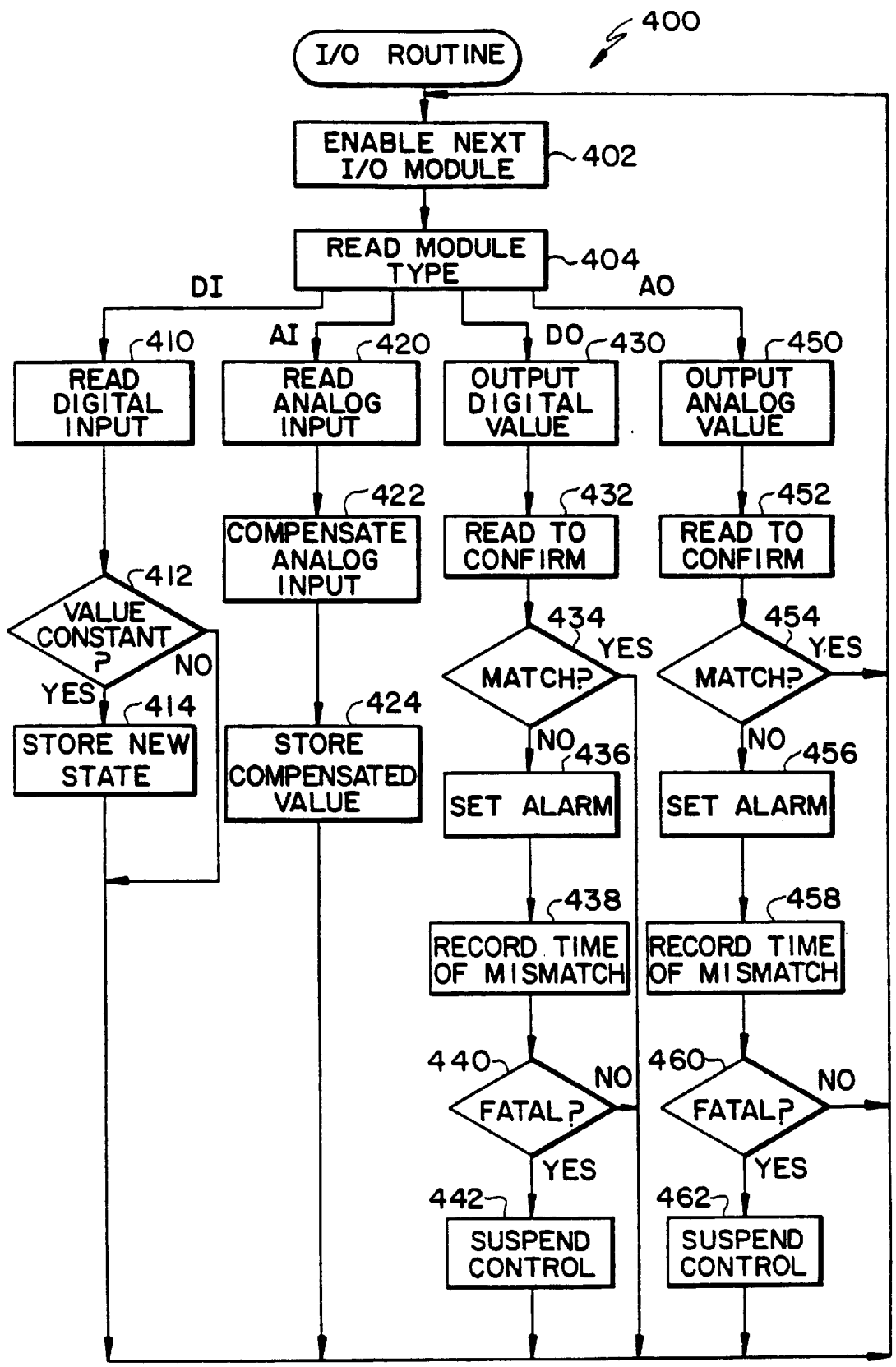
FIG. 10 is a flowchart of an I/O routine executed during operation of the process controller.

A flowchart of the I/O routine 400 is set forth in FIG. 10. Each time the I/O routine 400 is performed, the microprocessor 40 communicates with each of the I/O modules 68 to which it is connected.

At step 402, one of the I/O modules 68 which is connected to the microprocessor 40 is enabled. This is accomplished by the transmission of an enable signal from the microprocessor 40 to the buffer circuit of the I/O module 68. This enable signal is also referred to herein as a code-request signal since it causes the buffer to transmit the four-bit binary code indicating which type of I/O circuit 60 the microprocessor 40 is communicating with.

At step 404, the buffer transmits the four-bit binary code, indicating the type of I/O module, and the microprocessor 40 reads that code to ensure that the proper communication protocol is used since each of the four types of I/O modules 68 has a unique communication protocol.

If the code was 0000, which corresponds to a digital input circuit, steps 410–414, which define the communication protocol uniquely associated with a digital input circuit, are performed. At step 410, the microprocessor 40 reads the digital input on the line 128 (FIG. 5). At step 412, the microprocessor 40 determines whether the digital input is constant for a predetermined period of time. Step 412 is performed to ensure that transient signals are ignored. If the signal value was constant, the program branches to step 414 where the new value of the digital input is stored. If the value was not constant, the transient value is not stored and step 414 is skipped. The program then branches back to step 402 so that the microprocessor 40 can communicate with the next I/O module 68.

If the binary code of step 404 corresponded to an analog input circuit, steps 420–424 are performed. At step 420, the microprocessor 40 reads the analog input by reading the line 198 connected to the DO output of the A/D converter 180 (FIG. 6).

This analog input (which is in multi-bit binary form) is then compensated based upon the current temperature reading of the temperature transducer circuit 64. The amount of compensation is based on the gain characteristics of the analog input circuit 60*a* with temperature. The compensation could be a linear compensation with temperature or a more complex function. In the latter case, compensation data could be stored in a lookup table in a ROM.

Since the temperature inside the housing of the controller 22 would change relatively slowly, it is not necessary that the microprocessor 40 read the temperature signal from channel 0 of the A/D converter 370 (FIG. 9) each time the I/O routine 400 is executed. It would be sufficient to read the temperature signal at a more infrequent rate and store the results in memory for use each time the I/O routine 400 is executed.

At step 424, the compensated analog input value is stored in memory. The program then branches back to step 402 where the next I/O module 68 is enabled.

If the binary code of step 404 corresponded to a digital output circuit, steps 430–442 are performed. At step 430, the microprocessor 40 outputs a digital value to the I/O module 68. This is accomplished by transmitting either a binary one or a binary zero to the D flip-flop 220 via the line 222 (FIG. 7).

At step 432, the microprocessor 40 reads the line 266 (FIG. 7) to determine whether the digital output circuit 60*d* provided the correct output to the I/O device 34. This is accomplished at step 434 by comparing the binary value received on the line 266 with the binary value that was transmitted on the line 222.

If the two binary values match, indicating that the output was correct, then the program branches back to step 402. If the values do not match, an alarm is set at step 436. The time of the mismatch is then recorded in memory at step 438. The particular I/O module 68 which failed in this manner can also be recorded.

At step 440, if the mismatch is not fatal, the program branches back to step 402. Whether or not a mismatch is "fatal" is determined by a flag set by the operator. The setting of the fatal flag may depend, for example, on the relative importance of each particular I/O module 68 and/or the particular process being controlled.

If the mismatch is fatal, at step 442 control of the process is suspended, and the digital output value for that I/O module 68 may default to a particular fail state specified by the operator. For example, depending on the application, it may be desirable to have a solenoid-operated valve fail either open or closed.

If the binary code of step 404 corresponded to an analog output circuit, steps 450–462 are performed. At step 450, the microprocessor 40 outputs an analog value (in multi-bit binary form) to the I/O module 68 via the line 302 (FIG. 8).

At step 452 the microprocessor 40 reads the value of the multi-bit binary signal on channel 1 of the A/D converter 370 (FIG. 9). This value should correspond to the multi-bit binary value that the microprocessor 40 transmitted to the analog output circuit 60*b* via the line 302.

At step 454, if the two binary values are within a relatively small number of binary counts of each other, they are considered to match. If there is a match, the program branches back to step 402 where the next I/O module 68 is written to or read from by the microprocessor 40.

If the values do not match, an alarm is set at step 456. The time of the mismatch is then recorded at step 458. The particular I/O module 60 which failed can also be recorded.

At step 460, if the mismatch is not fatal, the program branches back to step 402. If the mismatch is fatal, at step 462 control of the process is suspended, and the analog output value for that I/O module 60 may default to a particular fail value specified by the operator.

It should be appreciated that the basic I/O routine 400 described above could be implemented in various ways. For example, after the initial classification of each of the I/O modules 68 upon power up, the microprocessor 40 could divide all of the I/O modules 68 into four groups based upon their type. Each of the groups could then be read in order, all of the digital input circuits being read first, then all of the analog input circuits being read next, etc. In this case, the step 404 of FIG. 10 would be a verification step to verify that the particular I/O module 68 belonged in the group currently being tested.

Alternatively, instead of dividing all the I/O modules 68 into groups based upon their classification, the microprocessor 40 could communicate with the I/O modules 68 based upon their positions on the I/O board 70. Thus, the microprocessor 40 could start at one end of the I/O board 70 and address each I/O module 68 in succession according to its physical location. In this case, each successive I/O module 68 could be a different type, and the step 404 would be a branch step, branching to a different one of the four basic communication protocols for each successive I/O module 68.

Of course, the four basic types of I/O modules 68 described above are not the only types that could be utilized. Other types of modules, such as pulse input modules specifically designed for inputting trains of digital pulses, could be used. Alternatively, the controller 22 may be used only to monitor process control conditions, in which case the controller 22 would not require either analog or digital output circuits.

A/D Converter Check Routine

During operation of the controller 22, the A/D converter 180 (FIG. 6) within each analog input circuit 60a is periodically checked for accuracy, such as every 10 seconds for example. This is accomplished by having the A/D converter 180 convert a known reference voltage to a multi-bit binary number, and then determining whether that binary number is within an expected range of binary numbers.

For example, assume that the A/D converter 180 converts a voltage between 0 and five volts to a 14-bit binary number. The binary number would be expected to be 0 when the voltage was zero and 4096 when the voltage was five volts. If the reference voltage provided to the A/D converter 180 during the check was precisely 2.5 volts, the expected binary output of the converter 180 would be 2048. Since very small fluctuations are expected, the binary output could be compared to make sure it is within a predetermined range by comparing it with a low range value of 2044 and a high range value of 2052. If the binary output fell within this range, the A/D converter 180 would be considered to be working properly.

Figure 11:
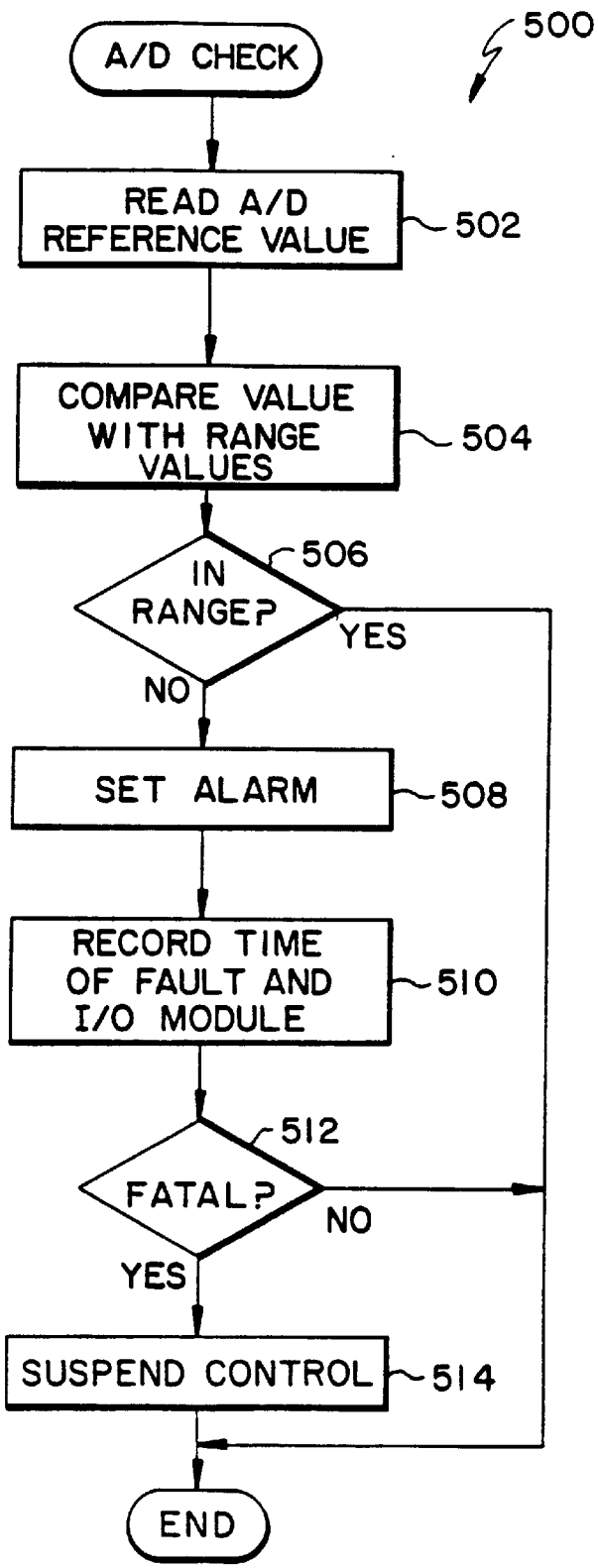
FIG. 11 is a flowchart of an A/D check routine periodically executed during operation of the process controller.

A flowchart of an A/D converter check routine 500 is shown in FIG. 11. As described above, the check routine 500 is periodically performed to check the A/D converter 180 within each of the analog input modules 68a. The routine 500, which illustrates the checking of one A/D converter 180, would be repeated to check each converter 180. The A/D converters 180 could be checked in any order and at any desired rate.

The check routine begins at step 502 where the A/D reference value is read by the microprocessor 40. This reference value, which is the reference voltage on channel 1 of the A/D converter 180 (FIG. 6), is converted to a multi-bit binary number. At step 504, this binary number is checked to determine whether it is in a predetermined range defined by a lower range value and an upper range value. At step 506, if the binary value is in range, the A/D converter 180 is operating correctly and the routine ends.

If the binary number is not within the range, an alarm is set at step 508. At step 510 the time of the A/D converter fault is recorded as well as the I/O module 68 containing the faulty A/D converter 180. Recording such fault data may be useful since the operator may want to know which historical data may be subject to error. At step 512, if the A/D converter fault is not fatal, the routine ends. If the fault is fatal, then at step 514 control of the process is suspended.

I/O Module Change Routine

Figure 12:
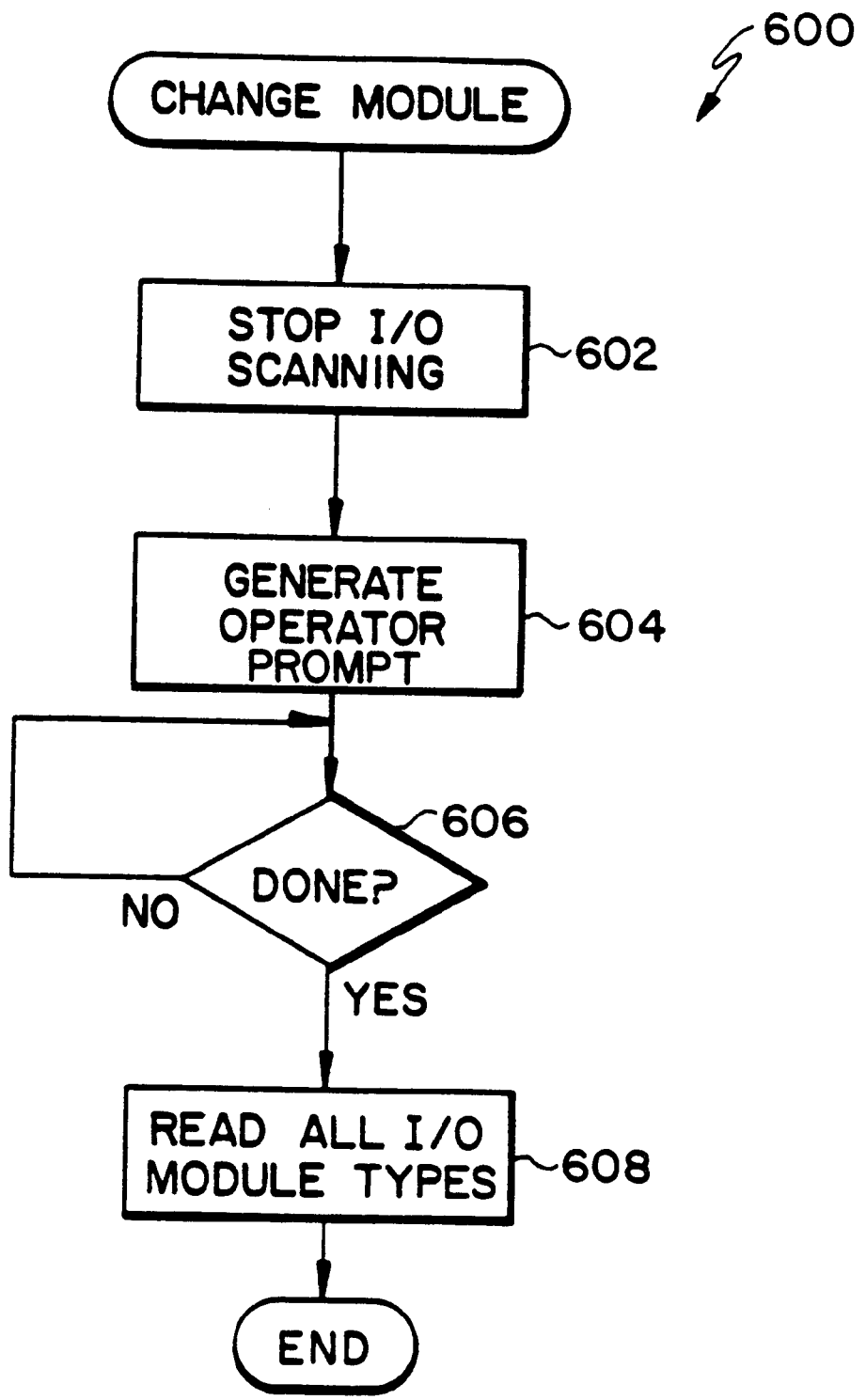
FIG. 12 is a flowchart of a change module routine that allows an operator to change the positions of the I/O modules within the process controller.

During operation of the controller 22, the operator may install additional I/O modules 68 onto the I/O board 70, remove modules 68 from the I/O board 70, change the positions of the existing modules 68, or any combination of the foregoing. This is accomplished with the use of an I/O module change routine 600, which is illustrated in FIG. 12. The operator initiates the change routine 600 by entering a module-change request via a keyboard (not shown) coupled to the controller 22.

Referring to FIG. 12, upon entry of the operator's module-change request, at step 602 the execution of the I/O routine 400 is suspended. At step 604, a visual prompt is generated on the controller display (not shown) instructing the operator to make the desired I/O module 68 changes.

The routine remains at step 606 until the operator has made the desired module changes. The completion of the changes is indicated by the operator by entering a module change-complete command. Upon receiving the change-complete command, the program branches to step 608 where all of the I/O modules 68 are read to determine the new module types. Step 608 is the same process that is performed upon power up of the controller 22 as described above.

Many modifications and alternative embodiments of the invention will be apparent to those of ordinary skill in the art in view of the foregoing description of the preferred embodiment. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of determining a type of a plurality of I/O circuits connected to a processor, said method comprising the steps of:

(a) transmitting a code-request signal from a processor to an I/O circuit;

(b) receiving a code signal from said I/O circuit in response to said code-request signal;

(c) determining the type of said I/O circuit based upon said code signal received from said I/O circuit during said step (b), said type being one of the four following types:
an analog input circuit,
an analog output circuit,
a digital input circuit, or
a digital output circuit;

(d) if the I/O circuit to which said code-request signal was transmitted during said step (a) is said analog input circuit, then communicating a first analog value from said I/O circuit to said processor;

(e) if the I/O circuit to which said code-request signal was transmitted during said step (a) is said analog output circuit, then communicating a second analog value from said processor to said I/O circuit;

(f) if the I/O circuit to which said code-request signal was transmitted during said step (a) is said digital input circuit, then communicating a first digital value from said I/O circuit to said processor;

(g) if the I/O circuit to which said code-request signal was transmitted during said step (a) is said digital output circuit, then communicating a second digital value from said processor to said I/O circuit; and (h) continuously repeating said steps (a) through (c) and one of said steps (d) through (g), said steps (a) through (c) being performed prior to each performance of one of said steps (d) through (g).

* * * * *